United States Patent [19]
Cristofich et al.

[11] Patent Number: 5,671,363
[45] Date of Patent: Sep. 23, 1997

[54] PRIVATE STOCK OPTION ACCOUNT CONTROL AND EXERCISE SYSTEM

[75] Inventors: John M. Cristofich, Bridgewater; Susan E. Warner, Lawrenceville, both of N.J.

[73] Assignee: Merril Lynch, Pierce, Fenner & Smith Inc., New York, N.Y.

[21] Appl. No.: 487,902

[22] Filed: Jun. 7, 1995

Related U.S. Application Data

[63] Continuation of Ser. No. 938,939, Sep. 1, 1992, abandoned.
[51] Int. Cl.$^6$ .......................... G06F 17/60; G06F 157/00
[52] U.S. Cl. ............................... 395/237; 395/236
[58] Field of Search .......................... 364/400, 401, 364/407, 408; 395/237, 236

[56] References Cited

U.S. PATENT DOCUMENTS

| | | | |
|---|---|---|---|
| 4,346,442 | 8/1982 | Musmanno | 364/408 |
| 4,674,044 | 6/1987 | Kalmus et al. | 364/408 |
| 4,823,265 | 4/1989 | Nelson | 364/408 |
| 4,953,085 | 8/1990 | Atkins | 364/408 |
| 5,126,936 | 6/1992 | Champion et al. | 364/408 |
| 5,132,899 | 7/1992 | Fox | 364/408 |
| 5,210,687 | 5/1993 | Wolfberg et al. | 364/408 |
| 5,227,967 | 7/1993 | Bailey | 364/408 |
| 5,233,514 | 8/1993 | Ayyoubi et al. | 364/408 |
| 5,262,942 | 11/1993 | Earle | 364/408 |

*Primary Examiner*—Robert A. Weinhardt
*Assistant Examiner*—Joseph Thomas
*Attorney, Agent, or Firm*—Hopgood Calimafde Kalil & Judlowe

[57] ABSTRACT

A data processing system for the management of stock option accounts for a plurality of participants. The system invokes one of several distinct option Plans that govern the transaction choices available to the participants. The governing option plans are defined by the sponsoring company in terms of grant, vest and expiration date for the option contracts. The system implements the designated Plans for multiple client companies providing several distinct modes for option exercise by the participant.

49 Claims, 6 Drawing Sheets

PRIVATE STOCK OPTION ACCOUNT CONTROL AND EXERCISE SYSTEM

RELATED APPLICATIONS

This is a continuation of application Ser. No. 07/938,939 filed Sep. 1, 1992, now abandoned.

The present invention generally relates to computer controlled account management systems for stock option management, and more particularly to a data processor for implementing a management control system for tracking and processing a plurality of segmented stock option accounts corresponding to individual participants in a company sponsored stock ownership plan.

BACKGROUND OF THE INVENTION

For many years publically owned companies often provided payment to upper level executives in the form of options to purchase shares of company stock at discounts from market price. These stock options were attractive for many reasons. For one, the option was a form of deferred payment that provided certain tax benefits and allowed the individual to control the time the income accrued. In addition, the provision of the opportunity to buy stock in the company was considered an attractive mechanism to foster additional incentives on the part of the option recipient to work harder for the benefit of the company.

In these earlier forms, option plans were of limited scope and only available to a handful of key executives. Indeed, the use of options as a form of compensation were routinely limited to the officers of a corporation while the remaining employees were either granted stock pursuant to pension plans or similar or more often than not, unable to participate in company sponsored ownership.

As alternative forms of compensation grow in popularity, companies are increasingly interested in providing payment to select employees in untraditional forms. Concepts such as flex time, position sharing, benefit tailoring etc. are populating the terminology of personnel departments as a vibrant mechanism for addressing staffing needs in a cost efficient manner.

More recently, companies are examining the possible broad use of stock option compensation to cover greater numbers of employees. This application offers the ability to stretch out staffing dollars and provide renumeration to employees in a form particularly desired by many staff members. Although greeted with substantial enthusiasm, the problems in implementing a company sponsored stock option plan are daunting. As the number of participants grow, the complexity in tracking salient data increases proportionately. For the most part, companies are not equipped to handle the transactional attributes of stock option processing on a scale above a handful of participants. This is true as the options must be individually tracked for proper delineation of inter alia grant, vest, exercise and expiration dates. Also, option exercise requires linkage to a brokerage house and established exchange for trading and consummating the options in accordance with the plan attributes.

The complexities of option account processing geometrically grow when more than one company is involved; this is also true for multinational companies working within the borders of foreign countries—each with a set of legal requirements on stock ownership and tax concerns for resident employees. Heretofore, there has been an absence of processing capabilities available to address the management of a multi-country, multi-company stock option account compensation plan for a plurality of individual accounts.

OBJECTS AND SUMMARY OF THE PRESENT INVENTION

It is the object of the present invention to provide a data processing system for managing a plurality of individual accounts directed to the holding and transacting of options for the purchase of securities in accordance with pre-established plan criteria.

It is another object of the present invention to provide a data processing apparatus for managing the implementation of one or more company stock option plans on a continuous basis.

It is a further object of the present invention to provide a system for processing plan constraints in a manner to provide responsive transactions in accordance with plan dictates and select inputs from plan participants.

It is an additional object of the present invention to provide a cashless transaction for the exercise of vested options in accordance with plan terms, through the use of a linked brokerage account for the plan participants.

The above and other objects of the present invention are realized in a data processing system including controlling stored programming directed to the managing and tracking of a plurality of individual accounts, current stock pricing, individual biographic data, company option plans and current withholding and other tax requirements. For each participant in a given plan, the system tracks the number of options to purchase stock that have been granted, the grant date, the number vested and vest date, and the number expired and date of expiration. At participant determined dates, the system implements a participant requested exercise of select options in accordance with the governing plan, e.g., option price, withholding percent, etc.

In accordance with the varying attributes of the present invention, the system uses a corresponding brokerage account held in the participant's name to implement the actual trades of stock necessary for the option exercise, with the market sale price on the exchange used to pay the plan sponsor (company) the option price, and remaining proceeds as compensation to the participant.

The foregoing features of the present invention may better appreciated from the following detailed description of a specific illustrative embodiment thereof, presented in conjunction with the following drawings:

DESCRIPTION OF THE PRESENT INVENTION

First briefly in overview, the present invention is directed to managing the operations associated with the broad scale implementation of individual stock option accounts for different companies and in accordance with distinct plans. The implementation is governed by an integrated control program delineating the commands in response to program logic and current environmental inputs. The system maintains records in memory of participating individuals having present or future rights to options of select stock, and a plurality of distinct option plans that dictate the implementation of the individual's rights in exercising the retained options. Processing is both time and event driven; for example, periodic updates to the participant's records will occur at regular (daily) intervals. In addition, select inputs will also trigger system processing, e.g., option exercise request or target price acquisition.

A sophisticated data processing system is used for this implementation including microprocessor based central processor units (cpu) interconnected with multiple I/O (input - output) controllers, segmented memory in both semiconductor and magnetic disk form, communication ports for dispersed processing and select real time input connections for e.g., incoming stock quotes. The controlling program can be written in one of several suitable languages (e.g., Cobol "C", Pascal, etc.), as long as the resulting executable version is compiled in a manner compatible with hardware selected for the central processor and peripheral work stations. For example, excellent results can be expected using Cobol II on an IBM 3090 (Sierra) system platform.

Figure 1:
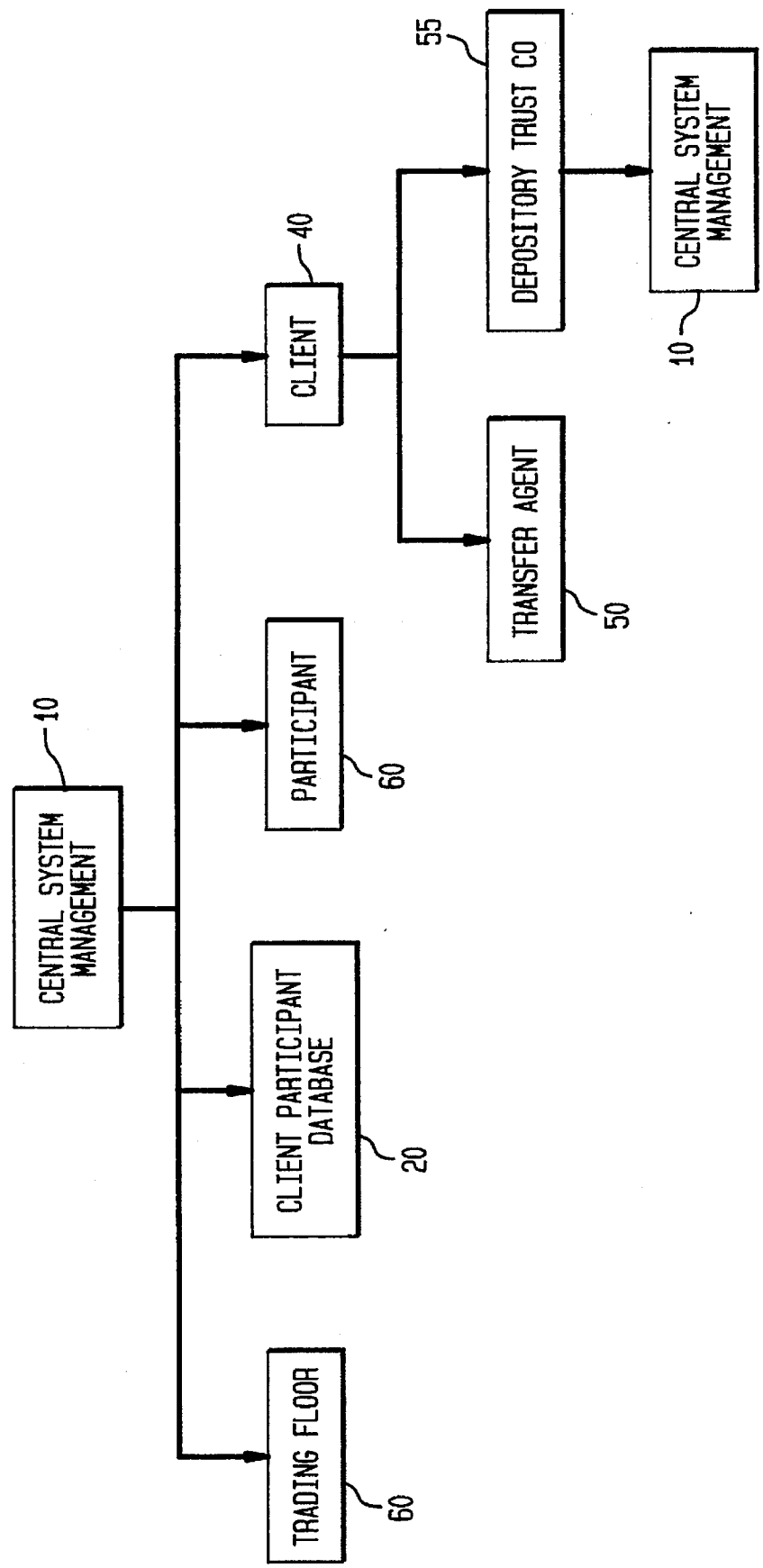
FIG. 1 provides a functional block diagram of the operative activities encompassed by the present invention.

With the foregoing overview in mind, attention is directed to FIG. 1 which provides a block diagram of the processing relationship between the various institutions involved in the operation of the present invention. More particularly, the system proprietor operates the system at a centralized location, block 10 where the central processing hardware is maintained. As stated above, the invention is directed to a plurality of separate accounts involving at a minimum segregated files on the participant and participant's brokerage account. This will of course require database 20 for maintenance of past and updated account files.

Continuing with FIG. 1, the individual blocks are interconnected with lines indicating channels of communication. For example, each participant, 30 has access to a corresponding account record via system management and may use this channel for entering option exercise orders, submit cash for execution, or request records for tax purposes. The system proprietor is operating the system for the benefit of one or more separate client companies, block 40, each with a diverse set of processing requirements for their respective group of employees. In this regard, the system incorporates communication channels vis-a-vis the client 40, the participants 30, and the system manager 10.

Actual transaction made in accordance with the dictates of the present invention are processed through one or more transfer agents 50, typically a bank or other trustee formed for the transactions involved. The transfer agent releases newly issued or treasury shares of stock in the client company which pass to the system manager (or associate broker) either directly or through a depository trust company (DTC), block 55. Finally, the system is linked via per se well-known communication path to one or more exchanges, block 60, for the transactions of shares in accordance with plan dictates, client constraints, participant requests, and brokerage account limitations.

To understand the logic commands governing the implementation of the present inventive system, a brief description of the salient terms may be helpful and thus provided in Table 1 below:

TABLE I

1. Option Grants. Options are granted to eligible employees at a price set on the grant date. The options have a limited lifetime, and expire at the end of their term if not exercised.
2. Vesting Period. Options are not exercisable until the completion of a vesting period, typically at least one year after grant date. Sponsors may specify their own vesting schedule.
3. Exercise Methods. Option exercise methods typically include traditional participant cash payments from private resources, as well as the sale of exercise shares to pay for the grant price, also known as the "cashless" exercise method. For global operation, the system must implement country specific restrictions that may inhibit cash or cashless transactions by law.
4. Income. Upon exercise, participants realize the spread between the option grant price and the exercise price (fair market value on exercise date) as taxable income. Plan sponsors must deduct this spread as compensation expense.
5. Withholding Taxes. Taxes on each participant's exercise income are withheld at rates specified by the plan sponsor. Funds to pay withholding taxes are raised through the sale of a number of the shares obtained through the exercise, and forwarded to the plan sponsor for payment to taxing authorities.
6. Brokerage Services. Each participant is required to open a brokerage account to facilitate exercises. The net number of shares obtained through the exercise is deposited into the account. Participants may hold the shares or sell them at their convenience.
7. Exercise Costs. Each exercise entails a variety of possible exercise costs, against which some percentage of the shares obtained on exercise are sold. These costs can include:
   Option price. Participants owe their employer, which issues the stock they receive on exercise, the option price times the number of options being exercised. (E.g., 100 options with a grant price of $37.50 equal an option price of $3,750.00.)
   Withholding Taxes. As described above, the spread on an option is taxable as ordinary income. Some international participants, however, may not be subject to taxation on this income.
   Commissions and Fees. The exercise of stock option and sale of shares to cover exercise costs entail transaction fees. Plan sponsors may choose to pay these commissions and fees on behalf of their stock option plan participants, or specify that participants pay for these through the sale of shares obtained from the exercise.

Figure 2:
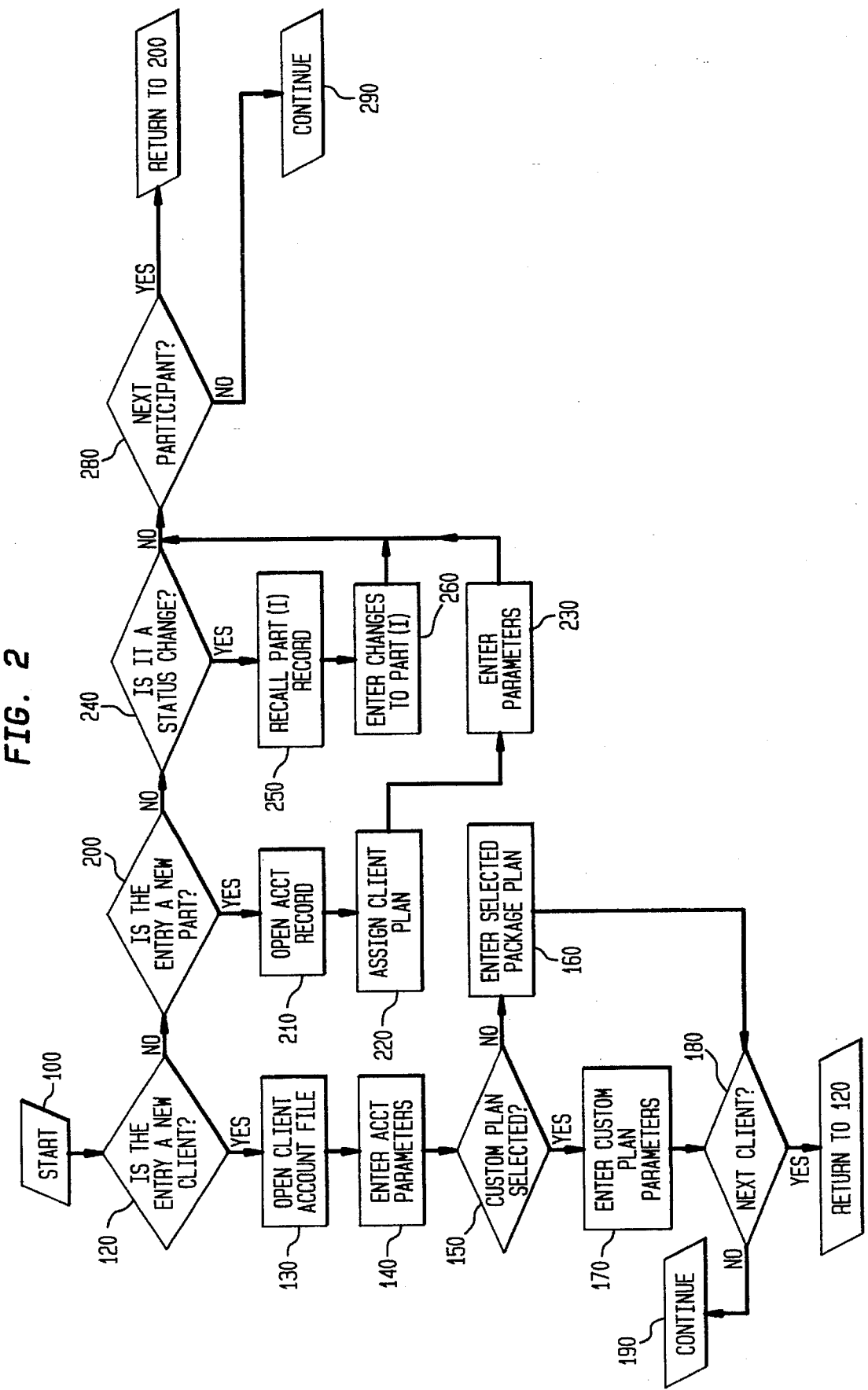
FIG. 2 provides a logic flowchart of the participant attribute module of the present invention.

Now turning to FIG. 2, the set up module is presented in logic flow path form, delineating the entry of set up data for a new or updated client/participant account file. More particularly, logic begins at block 100 and branches to the database manager module, block 110. This manager system permits access to the database of existing accounts, clients and participant records for retrieval and update purposes. As the population of clients/participants grow, the database manager will be automatically invoked via the link to system management for update processing.

For the purposes of the present discussion, the database manager is used to add new records and files for new client and/or participants and update existing files via test 120. A positive response to test 120 (indicating a new client entry, i.e., a new company interested in starting a plan for its participating employees that permit the granting and transacting of stock options on an ongoing managed basis) branches logic to block 130 wherein a designated addressable file location is allocated in the database for client profile parameters; these parameters as ascertained by the system manager are then entered at block 140.

The system will include several pre-packaged Plans for delineating the rights and obligations of the client to the participants regarding option processing. These Plans will be available to the new client as set forth in test 150, where a positive response invokes the selection process from the received client criteria. Based thereon, the selected Plan is entered into the database for governing future transactions for the new client.

Alternatively, the client may customize a stock option Plan in accordance with the client's particular needs and interests. This is done via a negative response to test 150 and the entry of custom Plan parameters at block 170. Processing then continues to the next client (new) test 180 or to continue block 190.

Continuing with FIG. 2, assuming a negative response to test 120, logic branches to test 200 which identifies whether the participant is new or existing within the database for that client. A positive response to test 200 (new participant) continues to block 210 for open/entry of a new record corresponding to that participant. The participant is then logically concatenated to the proper client, block 220 thus inheriting all the client delineated option Plan features previously entered for that client. Thereafter, the system seeks the remaining defining parameters for that participant for storage within the addressable database record, block 230. This continues for the next participant entry in que, test 280.

If the participant is already in the system ("no" to test 200), logic branches to test 240 to determine if a status change has been made to the participant's file. A status change is directed to the parameters stored for that participant and can include biographic, demographic or payment information such as a promotion, vesting of select options, termination, expiration of options, exercising options, or other changes. If a positive response is received, the salient records are accessed, block 250, and the appropriate changes entered into the records, block 260.

In the foregoing logic structure, the client and participant are system defined through a specified option Plan and in fact this Plan is modulated and incremented in accordance with the client so that a plurality of differing Plans are implemented by the system (Plan(I)—wherein I is an indexing variable for the differing clients using the option management system). In this context, the Plan incorporates the following profile of information used by the system in the processing of option accounts for the various participants.

TABLE II

| Description | Resp. | Size |
| --- | --- | --- |
| PLAN LEVEL RULES | | |
| (one page per plan) | | |
| Plan name | Mrking | 50 Chars |
| Plan source code | Oper | 9 Chars |
| Plan stock cusip | Oper | 8 Chars |
| Plan stock description | Oper | 20 Chars |
| VRS | Mrking | Yes or No |
| VRS phone number | Oper | 999-999-9999 |
| Annual or quarterly statements | Mrking | Annl or Qtrly |
| Customer letter short name 1 | Systems | 20 Chars |
| Customer letter short name 2 | Systems | 20 Chars |
| Customer letter phone number | Systems | 999-999-9999 |
| Account Assignment | Oper | Yes or No |
| Plan active date | Systems | CC/YY/MM/DD |
| Incentive Compensation | Mrking | Yes or No |

TABLE II-continued

| Description | Resp. | Size |
| --- | --- | --- |
| Fractional grants | Mrking | Yes or No |
| Allow zero grants | Mrking | Yes or No |
| Payroll data required for exercise | Mrking | Yes or No |
| Maximum year to date exercises | Mrking | 999 |
| Minimum exercise amount | Mrking | 9,999,999.9999 |
| Maximum exercise amount | Mrking | 9,999,999.9999 |
| Target price exercise duration days | Mrking | 999 |
| Exercise blackout start date | Mrkinq | CC/YY/MM/DD |
| Exercise blackout end date | Mrking | CC/YY/MM/DD |
| Limit price % | Mrking | 9.9999 |
| 1st sale inflation % | Mrking | 9.9999 |
| 1st sale minimum commission | Mrking | 999.99 |
| 1st sale commission % | Mrking | 9.9999 |
| 2nd sale inflation % | Mrking | 9.9999 |
| 2nd sale minimum commission | Mrking | 999.99 |
| 2nd sale commission % | Mrking | 9.9999 |
| Repeat following for each valid exercise type for the plan (max. 30 types) | | |
| Exercise type | Mrking | 6 Chars |
| Exercise code | Systems | 1 Char |
| Exercise description | Mrking | 30 Chars |
| COUNTRY RULES | | |
| (one page per country) | | |
| Country number | Oper | 999 |
| Country Name | Mrking | 30 Chars |
| Allow VRS exercises? | Mrking | Yes or No |
| New account form required? | Mrking/Legal | Yes or No |
| Force share delivery | Oper/Legal | Yes or No |
| Special user authority needed | Oper | Yes or No |
| Special userid's | Oper | 8 Chars |
| Repeat following for each valid exercise allowed (max. 30 types) | | |
| Valid exercise type | Mrking | 6 Chars |
| Valid exercise code | Systems | 1 Char |
| Valid exercise description | Mrking | 30 Chars |
| GRANT RULES | | |
| (one page per grant) | | |
| Grant date | Mrking | CC/YY/MM/DD |
| Grant price | Mrking | 99,999.99999 |
| Grant expiration date | Mrking | CC/YY/MM/DD |
| Maximum year to date exercises | Mrking | 999 |
| Minimum vesting amount | Mrking | 9,999,999.9999 |
| Vested outstanding cusip | Oper | 8 Chars |
| Vested outstanding account | Oper | 9 Chars |
| Vested lapsed cusip | Oper | 8 Chars |
| Vested lapsed account | Oper | 9 Chars |
| Unvested outstanding cusip | Oper | 8 Chars |
| Unvested outstanding account | Oper | 9 Chars |
| Unvested lapsed cusip | Oper | 8 Chars |
| Unvested lapsed account | Oper | 9 Chars |
| Exercise cusip | Oper | 8 Chars |
| Exercise account | Oper | 9 Chars |
| EMPLOYEE STATUS RULES | | |
| (one page per status) | | |
| Status code | Mrking | 1 Char |
| Status description | Mrking | 30 Chars |
| Exercise cutoff amount | Mrking | 9999 |
| Exercise cutoff type | Mrking | Years/Months/Days |
| VESTING RULES | | |
| (one page per grant per status) | | |
| Grant date | Mrking | CC/YY/MM/DD |
| Status code | Mrking | 1 Char |
| Vesting rate | Mrking | 9.9999 |
| Vesting calculation type | Mrking | Truncate or Round |
| Special vesting check | Systems | Yes or No |
| 100% vesting date | Systems | CC/YY/MM/DD |
| Repeat following for each event date (up to 25 event dates) | | |
| Event vesting date | Mrking | CC/YY/MM/DD |
| Event vesting rate | Mrking | 9.9999 |

In the above Plan profile, the column "Resp." indicates the specifying division of the system proprietor, e.g., "marketing". VRS is the Voice Response System that allows direct phone link to the system options for the user, via touch-tone entry. The column "Size" indicates the record format for database management.

Figure 3A:
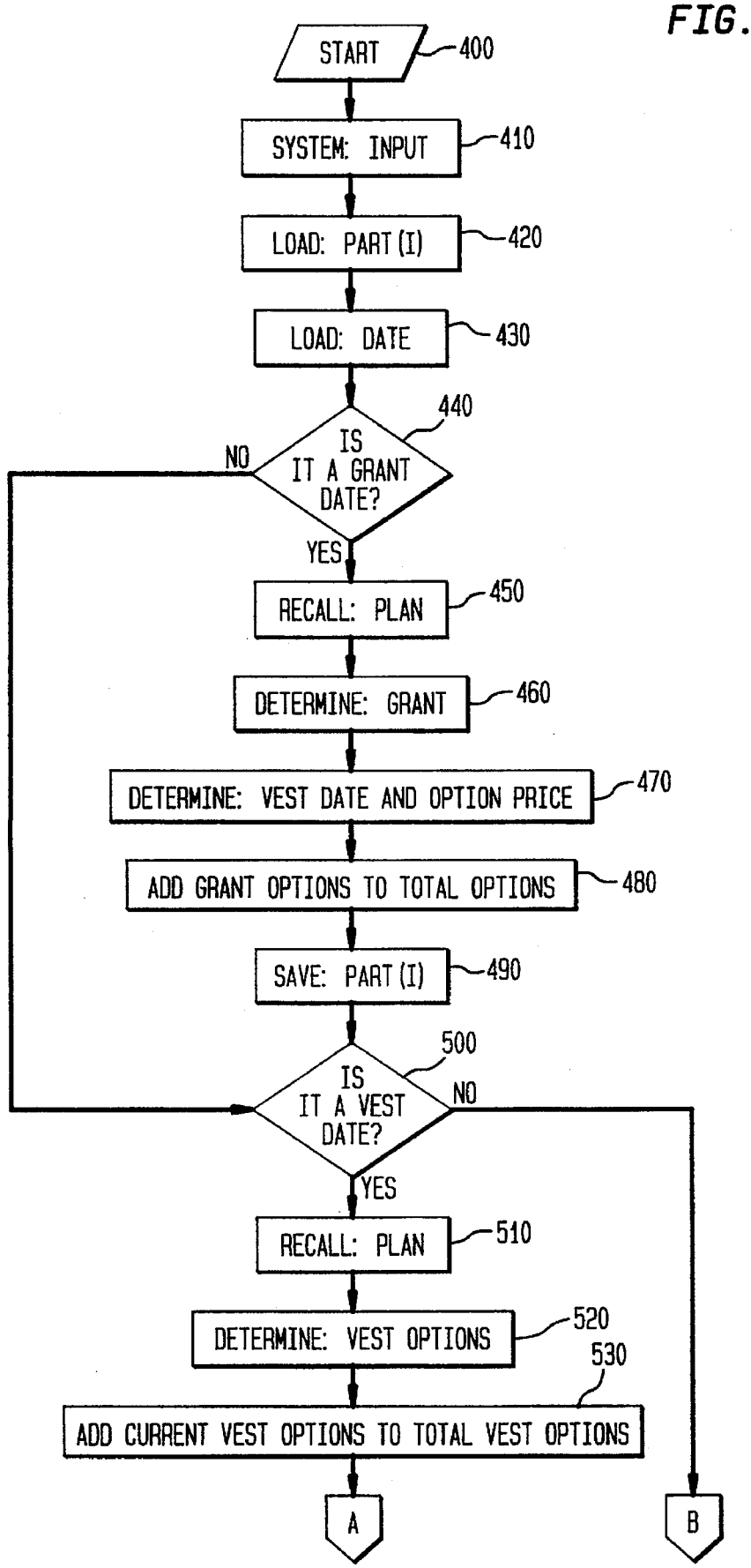
FIG. 3 provides a logic flowchart of the daily transaction processing implemented by the present invention.
Figure 3B:
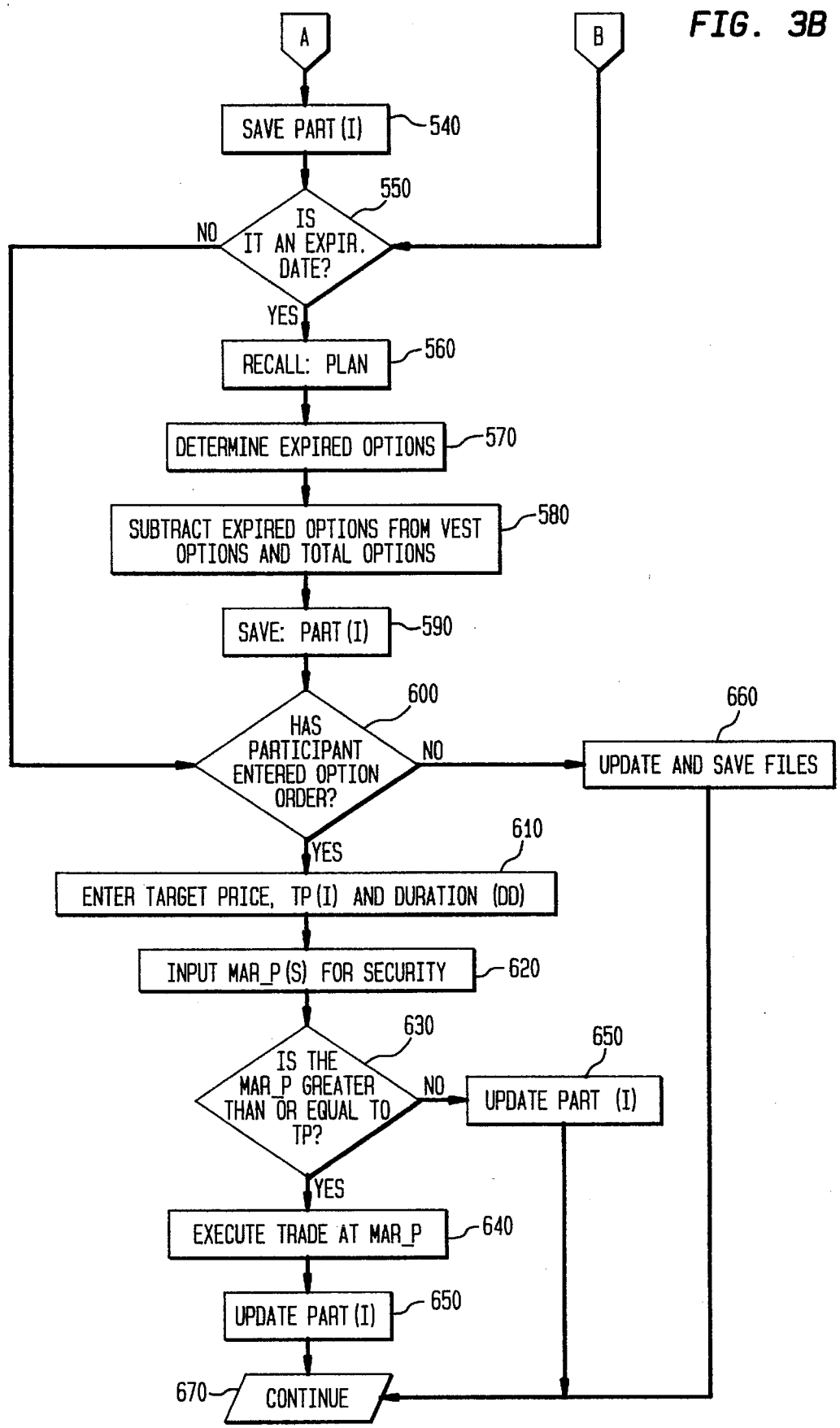

With the above Plan structure for illustration, attention is now directed to FIG. 3 depicting the logic path for the inventive system associated with periodic (daily) account processing. Beginning at block 400, logic uploads the system module at block 410. The system module governs the processing of accounts on the periodic or input driven basis. In this context, input driven processing is exemplified by a transaction request received by telephone from a participant. Periodic processing is time based (e.g., daily) and functions to control time based processing of accounts—for example the removal of vested options after the expiration of a Plan delineated termination period for the option. Other time based processing will include the comparison of current stock price on an exchange with a specified target price in a participant's file with a contingent transaction automatically executed if the price - quote comparison is satisfied. In this context, the current stock price corresponds to some recently completed and fixed transaction, such as "end of day" pricing. Other market pricing techniques may be employed.

Continuing in FIG. 3, at blocks 420 and 430 the system accesses the participant files in sequence for processing in accordance with the Plan dictates for the entered Date. Test 440 determines whether the participant/plan files delineate a grant date for the option account. If so ("yes"), logic proceeds to blocks 450–490 wherein the Plan is accessed and used to quantify and confirm the option grant, calculate vest and option price for the newly granted options and update the participant files in accordance therewith.

At test 500, the system determines if the date of processing is a vesting date for that Ith participant; if so, logic proceeds to blocks 510–540 for processing the participant records vis-a-vis the Plan and specifically updating the options (vested) available for transacting by the participant. The records for the Ith participant are updated with the new information replacing the existing files in the database.

Plan constraints often include time periods for exercising vested options. Therefore, after the passage of time, unexercised vested options will expire. The system module determines this at test 550 for each participant (unless the Plan for that participant has no time based option expiration function). A positive response to test 550 branches to blocks 560–590 wherein the Plan is accessed and the associated expired options removed from the participant's account.

As discussed above, exercise of options by the participant may be accomplished by both direct request or by a time function; this latter course involves the setting of a target price for the shares that is above the current market price, and the setting of transaction time period in terms of start time (or date) and span (duration of requested price delineated transactions). Once evoked, the system must continuously (implemented in incremental updates) receive market data for direct comparison to the target price—and automatically execute the requested transaction upon satisfaction of the target—market price comparison.

The foregoing is accomplished as follows. At test 600, the system determines if a target price exercise order has been entered for the user and if so the target price, TP(I) and the duration DD(I) for the Ith participant, block 610. The system then accesses the current quote for the specified security, MAR_P(D) at block 620 and compares the price data at test 630. If the comparison criteria is met, logic proceeds to block 640 wherein the system links to the exchange for automatic execution of the options exercised. The participant's account is then updated at block 650. If test 630 is not satisfied no transaction is authorized for this period and the participant's file is updated accordingly, block 660. The system then increments to the next (I+1) participant for further processing, block 670.

In addition to the entry of time driven exercise orders, the system processes exercise orders on an order receipt basis, i.e., order driven as opposed to event driven processing. In this context, the system provides two forms of execution to the participant with vested options—funded and cashless. The funded transaction is the traditional mechanism for processing options and involves the receipt from the option holder the share price defined in the option account which is then coupled with additional funds from the option grantor for purchasing the shares on the exchange. These shares are then provided to the option holder for disposition.

The alternate or cashless approach does not involve any contribution by the participant and is based on the normally common occurrence of an option price that is significantly below current market price of the shares. The cashless transaction involves the disposal of shares at market price (either treasury shares or previously purchased shares) with the proceeds divided between the client (option grantor—receiving the option price for the sold shares) and the participant who receives the market price minus option price (MAR_P–OPT_P) of the shares. This transaction is considered "cashless" as no initial contribution is required by the option holder.

A third form of option exercise involves the use of stock as directly contributed by the participant, which is then sold at open market with the proceeds used to fund the execution of the option. This third transaction form is only contemplated as a secondary right which may or may not be implemented depending on the other dictates of the system.

Figure 4:
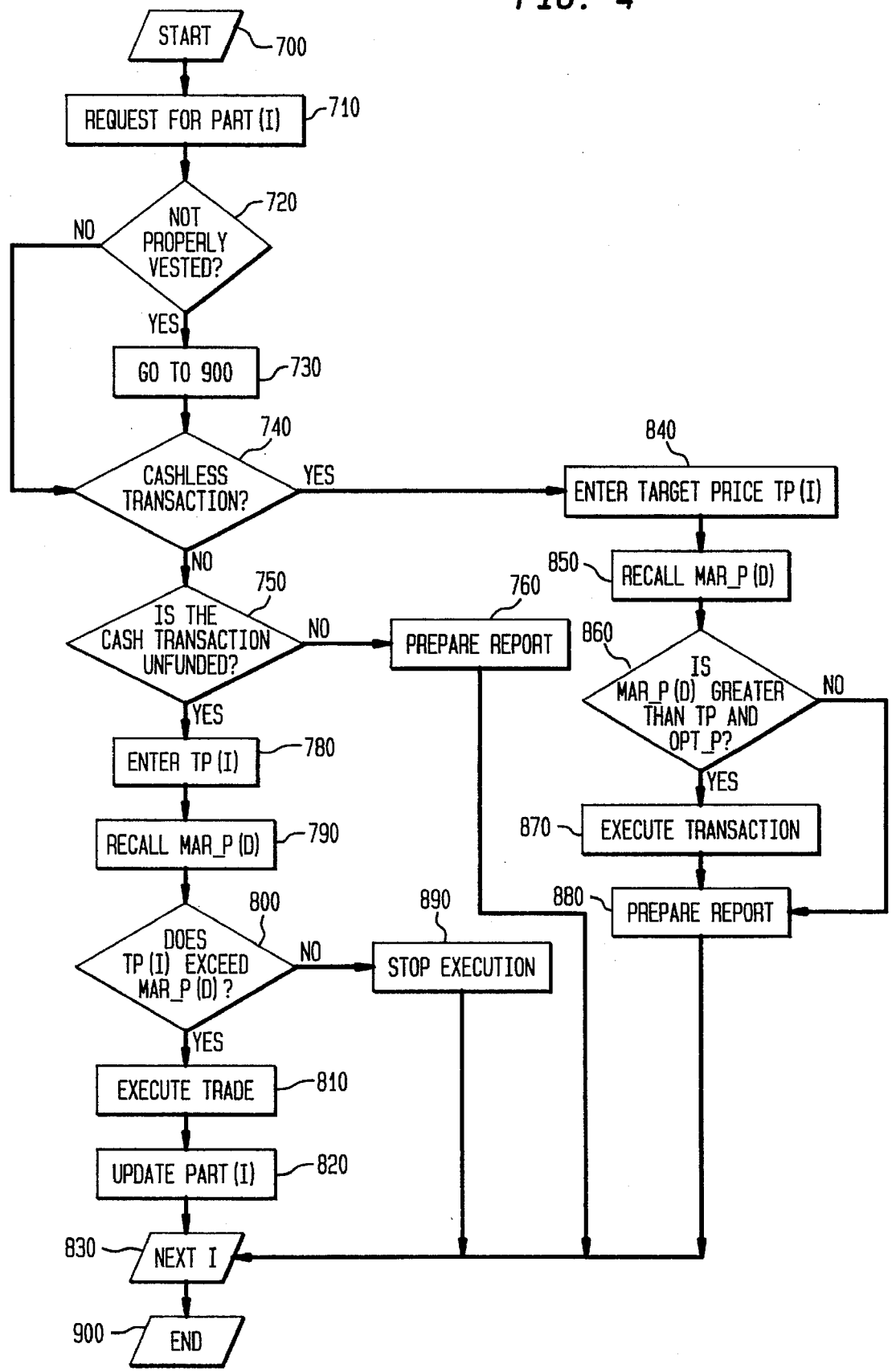
FIG. 4 depicts a logic flowchart of the option exercise module of the present invention.

The foregoing transactions are accomplished by the present system in accordance with FIG. 4. Beginning with start block 700, logic proceeds to block 710 and input of the current queued request for the Ith participant. At test 720, the system first confirms that the participant order is proper, i.e., the current records reflect possession of vested options to support the exercise request for that participant; other confirmation data may be accessed for foreign security laws on ownership, etc. as may be needed.

Assuming a positive response to test 720, logic continues to test 740 wherein the system determines the form of the transaction, i.e., cashless or funded. If the funded request is selected by the participant, logic branches to test 750 to confirm receipt of the necessary funds to support the purchase. As stated earlier, all transactions are based on the use of a concurrent brokerage account and the requisite funds may be established by one of several mechanisms such as margin on existing shares etc. If the transaction as requested is unfunded, ("no" to test 750) the system stops execution of the order and prepares a report, block 760.

If the transaction is fully funded, the system enters the participant selected target price for the transaction, TP(I) and recalls the current market price, MAR_P(D) at blocks 780 and 790 respectively. Test 800 compares the prices for the security with automatic execution of the transaction instituted upon satisfaction of the test via blocks 810–830. The target price may be and often is set at the current market price by the participant to insure execution of the option (i.e., test 800 always satisfied).

Continuing with FIG. 4 and assuming selection of the cashless transaction, processing proceeds to block 840 for the entry of the target price by the participant. Again the system accesses the current market price for that security and compares this value to the selected target price and additionally the stored option price for that participant. This latter test condition is required as the TP(I) must also support the payment of the option price and the accrued transaction fees pursuant to the designated cashless transaction. Satisfaction of this bifurcated conditional permits automated order execution via the brokerage account for that participant, blocks 870 and 890. Logic then proceeds to the next order in the queue.

Although the entry of option exercise instructions are made on an individual participant basis, the actual implementation of these transactions is done on a client/security basis, i.e., transactions for a given security are accumulated so that the actual trade order that reaches the exchange comprises many individual orders combined. The method of accumulation is not critical and may proceed by either a set time period or by volume of transactions in given securities.

Figure 5:
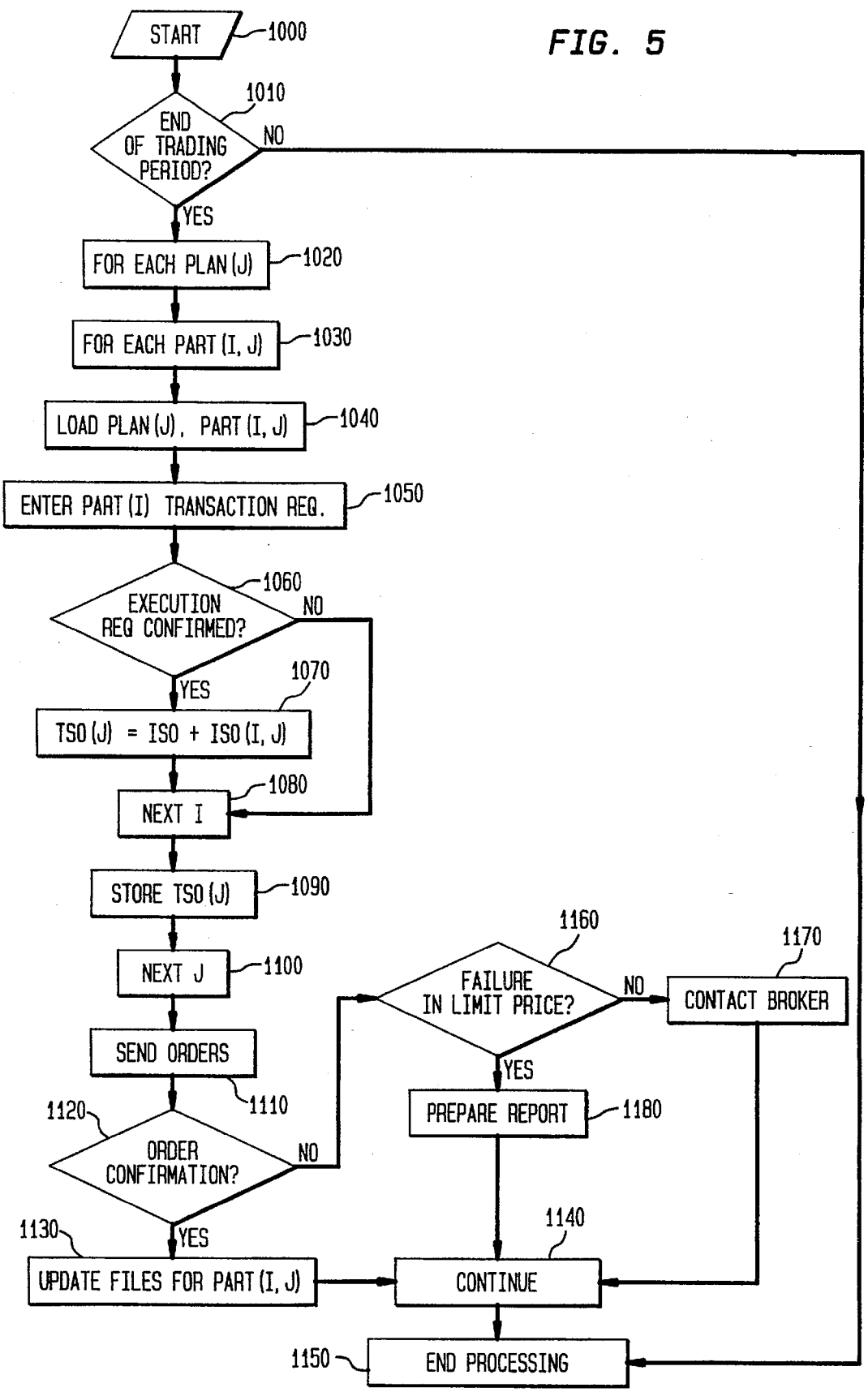
FIG. 5 provides a flowchart for the cumulative trading of shares in accordance with the instructions from participants on a plan or client basis.

This accumulation process is delineated in FIG. 5. At select intervals, the system begins the transaction procedure via start block 1000, confirming the transaction period at test 1010. A "yes" to test 1010 starts the transaction entry process; each plan is accessed and each participant incremented by indexing variables "J" and "I" respectively, blocks 1020–1040. At block 1050, the system accesses the transaction request REQ(I) for the Ith participant. If this REQ is confirmed at test 1060 (meets plan constraints and target price considerations), the system accumulates the optioned shares into the total for that security, block 1070, wherein TSO(J) represents the total stock options for the Jth security and ISO represents the individual stock options REQ by the Ith participant. Logic continues for each Ith participant and Jth Plan with the retention of TSO(J) for all J's in the system, blocks 1080–1100. These collected and confirmed orders are then sent to the exchange for execution, block 1110.

Continuing with FIG. 5, test 1120 confirms that the order as entered on the exchange was executed per instructions. A positive response to test 1120 is followed by system file update with the new information, block 1130. If the order cannot be confirmed, the system determines whether the a price limit failure occurred, test 1160. A price limit prevents a rapidly shifting market from causing a negative cash transaction by assuring that the market price received for the security is sufficient to cover the option price plus whatever incidentals may accrue. If a price limit triggered an aborted trade, a report is generated, block 1180; if the trade failed for some other reason (e.g., trading stopped for that security on the exchange) the system contacts the broker to complete the report, block 1170. This ends the processing until the next period or volume limit is reached, block 1150.

The above-described arrangement is merely illustrative of the principles of the present invention. Numerous modifications and adaptations thereof will be readily apparent to those skilled in the art without departing from the spirit and scope of the present invention.

What is claimed is:

1. A system for the management of a plurality of distinct accounts corresponding to the provision of privately issued option contract rights to a group of individuals in accordance with pre-established plan criteria, comprising:

addressable data storage means for nonvolatile storage of data in accounts segregated according to participant and client entries wherein participant data records include demographic and employment related information and specified accounts of granted, vested, and exercised options, of option holdings information for each of said accounts, of plan criteria, and of an axiomatic rule system at least in part defining said plan criteria and the exercise of said options;

client/participant communication means for accessing system management for entry of transaction requests and confirmation of stored information;

system management processor means for accessing said storage means and receiving said client/participant transaction requests and processing automatic security transactions in accordance therewith; and brokerage account means for accessing market price data on select securities and implementing said system-requested security transactions in accordance with said option holdings information and said axiomatic rule system.

2. The system of claim 1 wherein said accounts are separately categorized by participant and sponsoring client company.

3. The system of claim 1 wherein said processor means includes means for recording a participant selected target price for option exercise and means for tracking current market price for said option on an established exchange.

4. The system of claim 3 wherein a transaction is automatically executed upon satisfaction of specified transaction criteria including minimum market price for a security underlying said option.

5. The system of claim 4 wherein said transaction is either on a cash or cashless basis.

6. A data processing method for the management of a plurality of separate accounts corresponding to individual option grants pursuant to a company-sponsored privately issued stock option benefit plan, comprising the steps of:

accessing a stored database of participants, client companies, and option account plans wherein said client companies sponsor said plans and said plans delineate the accrued options for each participant account in accordance with an axiomatic rule system in said stored database, which axiomatic rule system at least in part defines said plan and the exercise of said option grants;

communicating with said participants and clients and at least one established market for exercising accrued options that have vested and for transacting securities in accordance with said plan;

updating said database pursuant to both time- and event-driven information including confirmation of changes in the number, value, or expiration date of new, vested, and exercised options;

exercising options in accordance with said axiomatic rule system and stored database information and pursuant to participant requests by either a cash, stock, or cashless exercise method wherein said exercise step includes confirmation that price variable MAR_P(D) is greater than a participant target price TP(I) and that the price excess over the total transactions for a given account is sufficient to pay the fees for said total of the transactions.

7. The method of claim 6 wherein said system automatically withholds portion of said exercise for tax purposes in accordance with pre-established tax withholding rates stored in said database.

8. The method of claim 6 wherein said exercising step includes the accumulation of individual execution orders by security type for cumulative execution on an established exchange.

9. The method of claim 8 wherein said accessing step is initiated on a time driven basis for incremental processing of plan, client and participant data files pursuant to recently entered data.

10. The method of claim 9 wherein said updating step includes the time driven vesting of select options for participants.

11. A data processing system for the management of plural accounts corresponding to the accrual of privately issued option rights in client securities in accordance with an option account governing plan comprising:

database means for storing plural account files corresponding to individual participants for option rights wherein said account files include biographic data on each of said participants, option right data for each of said participants, and an axiomatic rule system at least in part defining said plan and the exercise of said option rights;

data processing means for updating said account files pursuant to time driven events and participant input;

option transaction processor means for receiving option exercise transaction requests from each of said participants and implementing a security transaction effecting said option rights in accordance with said plan and said axiomatic rule system and providing an output indicative of the status of said requested transaction; and transaction report means for acknowledging said participant's transaction pursuant to said option transaction processor output on an event or time driven basis.

12. The system of claim 11 wherein said database means includes communication means for direct access by participants and plan sponsors for confirming account file information.

13. The system of claim 12 wherein said option transaction processor means includes means for confirming that a requested transaction will provide a return commensurate with a predetermined option price.

14. The system of claim 13 wherein said option transaction processor means includes means for compiling multiple transaction requests into a single security transaction order on for implementation on an exchange.

15. The system of claim 14 wherein said option transaction processor means provides at least two forms of option exercise mechanisms including a cash exercise and a cashless exercise.

16. The system of claim 15 wherein said data processing means includes clock means to control and implement time driven modifications to said accounts in said database.

17. A system for controlling the account and execution of options privately issued in accordance with a predefined plan and tradable or exercisable on a publicly accessible exchange, comprising:

at least one database storing addressable and updatable data mappable onto a plurality of individual accounts and comprising information indicative of the identity of each of said accounts, option holdings information for each of said accounts, and an axiomatic rule system at least in part defining said plan and the exercise of said options, said option holdings information including the number of privately issued options each for vested and nonvested options, the vesting date for each nonvested option, the expiration date of each option, the exercise price for each option issued in accordance with said plan, and any cash holding in such account;

a first communication system for accessing market information including price information and date information from said exchange relating to said options, and for updating said option holdings information therewith;

a second communication system for receiving and storing individual-requested transaction information for an option in an account associated with said individual; and a brokerage system for executing said individual-requested transaction in accordance with said axiomatic rule system, said option holdings information, and said market information.

18. The system of claim 17, wherein said second communication system includes a direct telephone link and a menuing system controllable by individual-activated touch tones transmitted via said telephone link.

19. The system of claim 18, wherein said first communications system operates and updates said option holdings information on a periodic basis.

20. The system of claim 19, wherein said period basis is daily.

21. The system of claim 17, wherein said axiomatic rules operate to remove, from said option holdings information, information relating to expired options.

22. The system of claim 17, further comprising processing means for changing said option holdings information as a function of said market date information to indicate the vesting of an option.

23. The system of claim 17, further comprising processing means for changing said option holdings information as a function of said market date information to indicate expiration of a vested option.

24. The system of claim 17, wherein said brokerage system sums the transactions requested by participants for execution and bundles such transactions effective to execute a single transaction for such options.

25. The system of claim 24, wherein said brokerage system executes at least two types of transactions selected from cash, stock, and cashless transactions.

26. The system of claim 25, wherein said brokerage system sums the total of said at least two types of transactions and bundles for all participants requesting that options be exercised pursuant to one of said at least two types of transactions all of the transactions for all participants so requesting, and executing said bundle of option exercises as a single transaction pursuant to said requested transaction type.

27. A data processing method for the management of a plurality of separate accounts corresponding to individual option grants pursuant to a company-sponsored, privately issued option benefit plan, said options for the purchase of securities, comprising the steps of:

providing an accessible database including data indicative of participants' identities, client companies, and option account plus, wherein said client companies sponsor said plans and said plan data delineates the accrued options for each participant account in accordance with an axiomatic rule system in said stored database, which axiomatic rule system at least in part defines said plan and the exercise of said option grants;

communicating with and receiving communications from said participants, said clients, and at least one established market for exercising accrued options that have vested;

updating said database pursuant to both time- and event-driven information including confirmation of changes in the number, value, or expiration date of new, vested, and exercised options; and exercising options pursuant to participant requests and in accordance with said axiomatic rule system wherein said exercise step includes confirmation that the exercise price of each of said options requested to be exercised is not less than the price of said security associated therewith.

28. The method of claim 27, wherein said option is exercised pursuant to a cash, stock, or cashless exercise method.

29. The method of claim 27, wherein said confirmation includes verifying that a price for said security is greater than a participant target price associated with said option.

30. The method of claim 29, wherein said exercise of options is performed only when the difference in price between said security and said target price is not less than a predetermined value.

31. The method of claim 30, wherein the sum of each of said predetermined values for the price difference for each option exercised during a particularly transaction is not less than a predetermined value.

32. The method of claim 31, wherein said predetermined value is equivalent to the sum of the transaction fees for all of the options exercised during a particular transaction.

33. The method of claim 27, further comprising determining the present time.

34. The method of claim 33, further comprising performing said method on a period basis as a function of the said present time.

35. The method of claim 34, wherein said periodic basis is daily.

36. A method for controlling the account and execution of options issued privately in accordance with a predefined plan and tradable or exercisable on a publicly accessible exchange, comprising:

providing at least one database storing addressable and updatable data mappable onto a plurality of individual accounts and comprising information indicative of the identity of each of said accounts, option holdings information for each of said accounts, and an axiomatic rule system at least in part defining said plan and the exercise of said options, said option holdings information including the number of privately issued options each for vested and nonvested options, the vesting date for each nonvested option, the expiration date of each option, the exercise price for each option issued in accordance with said plan, and any cash holding in such account;

accessing market information including price information and date information from said exchange relating to said options;

updating said option holdings information based on said accessed market information;

receiving and storing individual-requested transaction information for an option in an account associated with said individual; and brokering said individual-requested transaction in accordance with said axiomatic rule system, said option holdings information, and said market information.

37. The method of claim 36, wherein said individual-requested transaction information includes receiving such information via a direct telephone link.

38. The method of claim 37, further comprising providing said individual with access to a menuing system controllable said individual via individually-controlled much tones transmitted via said telephone link.

39. The method of claim 36, wherein updating of said option holdings information is performed on a periodic basis.

40. The method of claim 39, wherein said period basis is daily.

41. The method of claim 36, further comprising defining said plan at least in part by a set of axiomatic rules operating to remove, from said option holdings information, information relating to expired options.

42. The method of claim 41, further comprising modifying said set of axiomatic rules.

43. The method of claim 36, further comprising changing said option holdings information as a function of said market date information indicative of the vesting of an option.

44. The method of claim 36, further comprising changing said option holdings information as a function of said market date information indicative of the expiring of an option.

45. The method of claim 36, further comprising receiving from said brokering the proceeds of said transaction and transferring same into said individual's account.

46. The method of claim 45, further comprising withholding from said proceeds transferred into said individual's account an amount in accordance and as a function of said plan.

47. The method of claim 36, further comprising calculating from said date information and said option holdings information whether any options in an individuals account vest on said date, and updating said options holding information when any such option vests.

48. The method of claim 36, further comprising summing for more than one of said accounts the total options requested by each of said individuals to be exercised, and brokering said summed options in a single transaction.

49. The method of claim 48, wherein said summing occurs over all of the participants in said plan.

* * * * *